US011423168B2

(12) United States Patent
Lee et al.

(10) Patent No.: US 11,423,168 B2
(45) Date of Patent: *Aug. 23, 2022

(54) ELECTRONIC APPARATUS AND METHOD OF TRANSFORMING CONTENT THEREOF

(71) Applicant: SAMSUNG ELECTRONICS CO., LTD., Suwon-si (KR)

(72) Inventors: Ho-jung Lee, Seoul (KR); Yong-sang Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

This patent is subject to a terminal disclaimer.

(21) Appl. No.: 16/860,161

(22) Filed: Apr. 28, 2020

(65) Prior Publication Data

US 2020/0257819 A1 Aug. 13, 2020

Related U.S. Application Data

(63) Continuation of application No. 15/226,216, filed on Aug. 2, 2016, now Pat. No. 10,671,745.

(30) Foreign Application Priority Data

Aug. 21, 2015 (KR) .......................... 10-2015-017772

(51) Int. Cl.
*G06F 21/62* (2013.01)
*G06F 16/51* (2019.01)
(Continued)

(52) U.S. Cl.
CPC .......... *G06F 21/6218* (2013.01); *G06F 16/51* (2019.01); *G06F 16/9535* (2019.01);
(Continued)

(58) Field of Classification Search
CPC .. G06F 21/6218; G06F 16/9535; G06F 21/31; G06F 21/6245; H04W 4/21
See application file for complete search history.

(56) References Cited

U.S. PATENT DOCUMENTS 7,907,149 B1  3/2011  Daum
8,312,527 B2  11/2012  Hashimoto
(Continued)

FOREIGN PATENT DOCUMENTS

CN    101241526 A    8/2008
CN    101779212 A    7/2010
(Continued)

OTHER PUBLICATIONS

Communication dated Sep. 1, 2020, issued by the Chinese Patent Office in counterpart Chinese Application No. 201680047838.3.
(Continued)

*Primary Examiner* — Jason Chiang
(74) *Attorney, Agent, or Firm* — Sughrue Mion, PLLC

(57) ABSTRACT

An electronic apparatus is provided, which includes a memory, a communicator, and a processor configured to receive a user command requesting sharing of content, search the content for a region which has security information, based on the received user command, extract an image corresponding to the security information from the found region, identify the security information in the image, and determine whether to change the image, based on the identified security information.

17 Claims, 10 Drawing Sheets

(51) Int. Cl.
*G06F 16/9535* (2019.01)
*H04W 4/21* (2018.01)
*G06F 21/31* (2013.01)

(52) U.S. Cl.
CPC .......... *G06F 21/31* (2013.01); *G06F 21/6245* (2013.01); *H04W 4/21* (2018.02)

(56) References Cited

U.S. PATENT DOCUMENTS

| | | | |
|---|---|---|---|
| 8,897,484 | B1 | 11/2014 | Fredinburg et al. |
| 9,036,040 | B1* | 5/2015 | Danko .................... G06T 5/009 348/222.1 |
| 9,298,969 | B2 | 3/2016 | Sako et al. |
| 9,310,926 | B2 | 4/2016 | Chung |
| 9,681,287 | B2 | 6/2017 | Yang et al. |
| 9,832,189 | B2 | 11/2017 | Han et al. |
| 2005/0259845 | A1* | 11/2005 | Dehlin .................... G06F 3/002 382/103 |
| 2006/0008124 | A1* | 1/2006 | Ewe .................... G06K 9/00597 382/117 |
| 2006/0056670 | A1* | 3/2006 | Hamadeh .............. G06T 7/0002 382/128 |
| 2009/0044254 | A1* | 2/2009 | Tian ...................... H04L 9/3234 726/4 |
| 2009/0112872 | A1 | 4/2009 | Doi |
| 2009/0244364 | A1 | 10/2009 | Nonogaki |
| 2010/0050247 | A1 | 2/2010 | Hashimoto |
| 2012/0183174 | A1* | 7/2012 | Basavapatna .......... H04L 51/08 382/100 |
| 2012/0265578 | A1* | 10/2012 | Olding .................... G06Q 10/06 705/7.25 |
| 2013/0004090 | A1 | 1/2013 | Kundu et al. |
| 2013/0108105 | A1 | 5/2013 | Yoo et al. |
| 2013/0188842 | A1 | 7/2013 | Hauke |
| 2013/0263207 | A1 | 10/2013 | Granstrom |
| 2014/0003681 | A1 | 1/2014 | Wright et al. |
| 2014/0007185 | A1 | 1/2014 | Han et al. |
| 2014/0023248 | A1* | 1/2014 | Yoo .................... G06K 9/00288 382/118 |
| 2014/0112534 | A1 | 4/2014 | Sako et al. |
| 2014/0122342 | A1 | 5/2014 | Rajakarunanayake et al. |
| 2014/0191994 | A1 | 7/2014 | Chung |
| 2014/0196143 | A1 | 7/2014 | Fliderman et al. |
| 2014/0213302 | A1 | 7/2014 | Yang et al. |
| 2015/0049912 | A1* | 2/2015 | Migdal .................... G06T 11/60 382/103 |
| 2015/0143538 | A1 | 5/2015 | Tsou |
| 2015/0161483 | A1* | 6/2015 | Allen .................... G06F 21/6245 382/118 |
| 2015/0205978 | A1* | 7/2015 | Eisen ................ H04N 1/00864 726/27 |
| 2015/0220777 | A1* | 8/2015 | Kauffmann .......... H04N 5/2621 382/103 |
| 2015/0243063 | A1* | 8/2015 | Yoon ...................... G06F 21/84 345/634 |
| 2017/0186138 | A1* | 6/2017 | Raducan .............. G06K 9/0061 |

FOREIGN PATENT DOCUMENTS

| | | |
|---|---|---|
| CN | 102067175 A | 5/2011 |
| CN | 102222216 A | 10/2011 |
| CN | 103049755 A | 4/2013 |
| CN | 103778376 A | 5/2014 |
| CN | 103914646 A | 7/2014 |
| CN | 103970825 A | 8/2014 |
| CN | 104321778 A | 1/2015 |
| CN | 104321786 A | 1/2015 |
| CN | 104335226 A | 2/2015 |
| CN | 104598882 A | 5/2015 |
| CN | 104656885 A | 5/2015 |
| CN | 104778417 A | 7/2015 |
| JP | 2005-175765 A | 6/2005 |
| JP | 2011-180900 A | 9/2011 |
| JP | 2013-192835 A | 9/2013 |
| JP | 2013-210902 A | 10/2013 |
| JP | 2014-89625 A | 5/2014 |
| KR | 10-2013-0047223 A | 5/2013 |
| KR | 10-2014-0012474 A | 2/2014 |
| KR | 10-2014-0035753 A | 3/2014 |
| KR | 10-2014-0094966 A | 7/2014 |
| KR | 10-1458136 B1 | 11/2014 |
| WO | 2009/145826 A2 | 12/2009 |
| WO | 2014/004642 A1 | 1/2014 |
| WO | 2014/025448 A1 | 2/2014 |

OTHER PUBLICATIONS

Communication dated Oct. 29, 2020, issued by the India Patent Office in counterpart Indian Application No. 201847008181.
Communication dated Sep. 24, 2019, from the European Patent Office in counterpart European Application No. 18201868.9.
Communication dated Dec. 4, 2018, issued by the European Patent Office in counterpart European Application No. 18201868.9.
Search Report dated Dec. 12, 2016, issued by the International Searching Authority in counterpart International Patent Application No. PCT/KR2016/009157 (PCT/ISA/210).
Written Opinion dated Dec. 12, 2016, issued by the International Searching Authority in counterpart International Patent Application No. PCT/KR2016/009157 (PCT/ISA/237).
Communication dated Dec. 14, 2016 issued by the European Patent Office in counterpart European Patent Application No. 16184625.8.
Communication dated Sep. 20, 2017, issued by the European Patent Office in European application No. 16184625.8.
Communication dated Mar. 10, 2021, issued by the State Intellectual Property Office of P.R. China in counterpart Chinese Application No. 201680047838.3.
Jian Huang, "New Media Wave," Guangxi Education Publishing House, Jul. 2011, Total 5 pages.
Jun Wang, "Media regulation and ethics," Communication University of China Press, Mar. 2010, Total 5 pages.
Communication dated Jul. 26, 2021, from The China National Intellectual Property Administration in Application No. 201680047838.3.
Communication dated Dec. 1, 2021 issued by the Korean Intellectual Property Office in counterpart English Korean Application No. 10-2015-0117772 Translation.
Communication dated Mar. 7, 2022 by the Korean Patent Office for Korean Patent Application No. 10-2015-0117772.
Communication dated Mar. 29, 2022 by the State Intellectual Property Office of the People's Republic of China for Chinese Patent Application No. 201680047838.3.

* cited by examiner

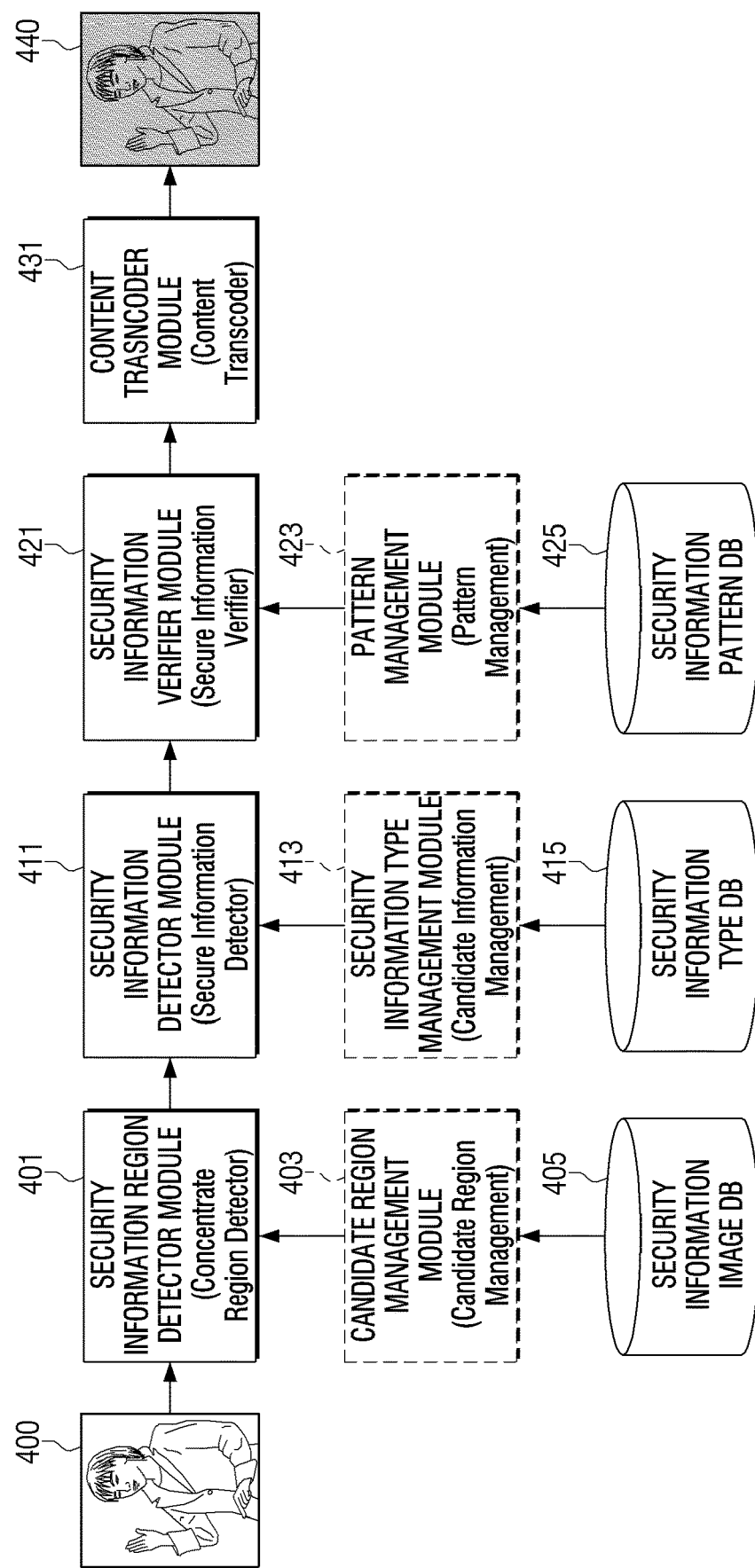

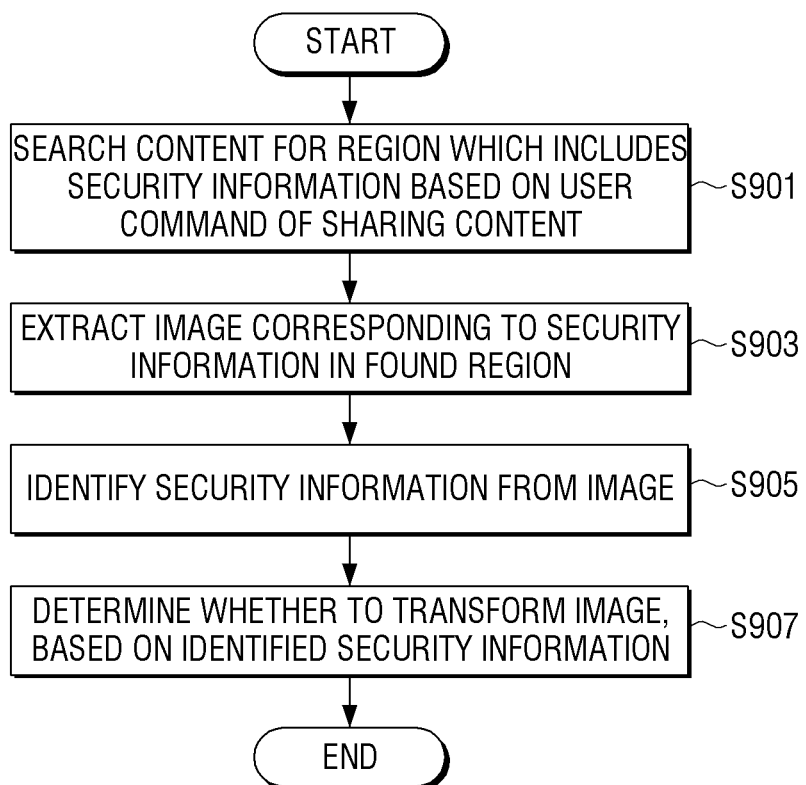

ELECTRONIC APPARATUS AND METHOD OF TRANSFORMING CONTENT THEREOF

CROSS-REFERENCE TO RELATED APPLICATIONS

This is a continuation application based on U.S. patent application Ser. No. 15/226,216, filed Aug. 2, 2016, in the U.S. Patent and Trademark Office, which claims priority from Korean Patent Application No. 10-2015-0117772, filed on Aug. 21, 2015, in the Korean Intellectual Property Office, the disclosure of which is incorporated herein by reference in its entirety.

BACKGROUND

1. Field

Apparatuses and methods consistent with exemplary embodiments broadly relate to an electronic apparatus and a method of transforming content thereof, and more particularly, to an apparatus and a method for detecting an image capable of including security information from an image included in content and deleting the security information from the image or transforming the security information.

2. Description of the Related Art

Due to recent development of electronic technology, an electronic apparatus such as a smartphone includes various types of sensors and reinforces a security function by using these various types of sensors. In particular, a security function is realized by using bio-information of a user in order to easily reinforce security and disable the security.

Attempts to hack this security function have been made, in particular, a high-resolution image has been acquired due to the development of a camera sensor technology. Also, bio-information of a user included in the high-resolution image has been identified so as to disable a security function. In particular, Social Network Service (SNS) has been invigorated due to the development of communication technology, and thus, content including a high-resolution image has been easily shared, thereby sharing security information included in the shared image.

There has been developed technology that transforms content into low capacity content and then provides the low-capacity content when sharing the content so as to make personal information included in a high-resolution image difficult to be identified.

SUMMARY

Exemplary embodiments overcome the above disadvantages and other disadvantages not described above. Also, exemplary embodiments are not required to overcome the disadvantages described above, and an exemplary embodiment may not overcome any of the problems described above.

Since a quality of content is lowered if the content is transformed into low capacity content and provided as the low capacity content when sharing the content through a Social Network Service (SNS), a technology that provides a high-resolution content and enables security information not to be identified is required.

An electronic apparatus according to an exemplary embodiment may, in response to a user command of sharing content, being input, search the content for a region which includes security information, extract an image corresponding to the security information from the found region, identify the security information from the image to transform the image corresponding to the security information, synthesize the transformed image with the content, and share the content so as to provide the content from which the security information is deleted. That is, in an exemplary embodiment, the content is provided as high-resolution image without the security information i.e., with the security information being extracted therefrom.

According to an aspect of an exemplary embodiment, an electronic apparatus includes a memory which is configured to store computer-executable instructions, and a processor configured to receive a user command requesting sharing content, search the content for a region which has security information in response to receiving the user command, extract an image corresponding to the security information from the found region, identify the security information in the extracted image, and determine whether to transform the extracted image, based on the identified security information.

The processor may transform the image in response to the security information being identified. The processor may identify a type of the identified security information and transform the image based on the identified type of the security information. The type of the security information may include at least one selected from among a fingerprint, an iris, a number, a letter, and a pattern.

The electronic apparatus may further include a communicator configured to communicate with an external apparatus. The processor may generate second content by synthesizing the transformed image with the content and may transmit the generated second content to the communicator. The processor may change the image by changing a resolution of the image and/or by distorting the image or a portion thereof. The processor may store in the memory an image database of a component comprising at least one selected from among a part of an item and a human body capable of having the security information and perform searching for the region having the security information with reference to the image database. The processor may receive data about the component from a server via the communicator and perform searching with reference to the received data.

According to another aspect of an exemplary embodiment, a method of transforming content of an electronic apparatus, includes searching first content for a region which includes security information, in response to finding the region based on the searching, extracting an image corresponding to the security information from the found region, transforming the extracted image, and generating second content by synthesizing the transformed image with the first content. The searching may include searching for the region with the security information with reference to an image database which stores the image of a component selected from among a part of an item and a part of a human body capable of having the security information. The image database may be internal to or external to the electronic apparatus.

The method may further include determining a type of the security information included in the found region. The type of the security information may include at least one selected from among a fingerprint, an iris, a number, a letter, and a pattern. The image may be transformed based on the determined type of the security information. The transforming of the extracted image may include at least one selected from among lowering a resolution of the image or a part thereof and distorting the image or a part thereof.

The method may further include identifying the security information in the extracted image. The image may be transformed based on the identified security information. The image may be changed based on determining whether the identified security information can unlock the electronic apparatus.

According to yet another aspect of an exemplary embodiment, a method of transforming content includes: searching content for a region which has security information based on a user command requesting sharing of the content, extracting an image corresponding to the security information from the region found in the searching, identifying the security information in the extracted image, and determining whether to transform the extracted image, based on the identified security information.

In response to the security information being identified, the image may be determined as being transformed. In response to the security information not being identified, the image may be determined as not being transformed. The method may further include generating second content by synthesizing the transformed image with the content, and sharing the generated second content.

Additional and/or other aspects and advantages of exemplary embodiments will be set forth in part in the description which follows and, in part, will be obvious from the description, or may be learned by practice of exemplary embodiments.

BRIEF DESCRIPTION OF THE DRAWINGS

The above and/or other aspects will be more apparent by describing certain exemplary embodiments with reference to the accompanying drawings, in which:

FIG. 4 is a view illustrating processing of content including security information according to an exemplary embodiment;

FIG. 9 is a flowchart illustrating a process of automatically deleting security information from content and then sharing the content according to an exemplary embodiment.

DETAILED DESCRIPTION OF EXEMPLARY EMBODIMENTS

Figure 1:
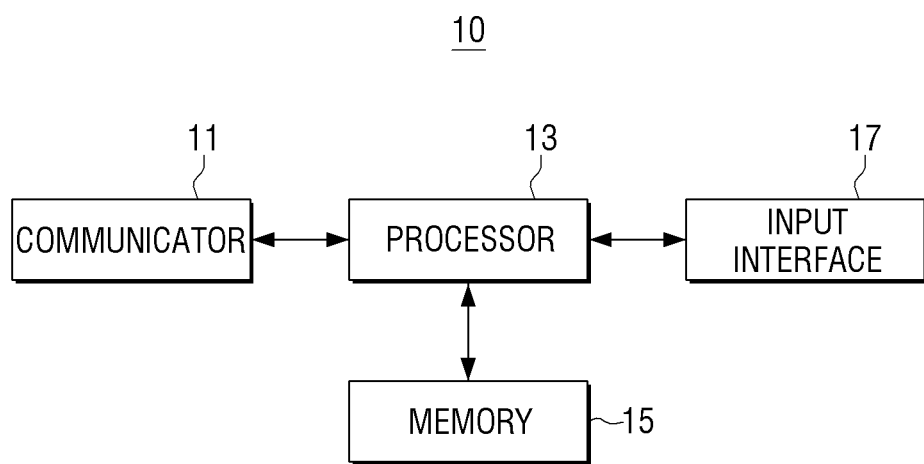
FIG. 1 is a block diagram illustrating an electronic apparatus according to an exemplary embodiment.

Certain exemplary embodiments will now be described in greater detail with reference to the accompanying drawings.

In the following description, same drawing reference numerals are used for denoting analogous elements even in different drawings. The matters defined in the description, such as detailed construction and elements, are provided to assist in a comprehensive understanding of exemplary embodiments. Thus, it is apparent that the exemplary embodiments can be carried out without those specifically defined matters. Also, well-known functions or constructions are not described in detail since they would obscure exemplary embodiments with unnecessary detail.

Hereinafter, while various exemplary embodiments are capable of various modifications and alternative forms, exemplary embodiments thereof are shown by way of example in the drawings and will herein be described in detail. It may be understood, however, that there is no intent to limit exemplary embodiments to the particular forms disclosed, but on the contrary, exemplary embodiments are to cover all modifications, equivalents, and alternatives falling within the scope of an inventive concept. Like numbers refer to analogous elements throughout the description of the figures.

Also, the terms "have", "may have", "include", "may include", etc. designate the presence of features, numbers, steps, operations, components, elements, or a combination thereof that are written in the specification, but do not exclude the presence or possibility of addition of one or more other features, numbers, steps, operations, components, elements, or a combination thereof.

As used herein, the expressions "A or B", "at least one of A and/or B", "at least one or more of A or/and B", etc. may include all possible combinations of items that are listed together. For example, "A or B", "at least one of A and B", or "at least one of A or B" may refer to a case of including at least one A, at least one B, or at least one A and at least one B.

Although the terms, 'first', 'second', etc. may be used herein to describe various elements regardless of orders and/or importances, these elements should not be limited by these terms. These terms are only used to distinguish one element from another. For example, a first element could be termed a second element, and, similarly, a second element could be termed a first element, without departing from the scope of exemplary embodiments.

It will be understood that when an element (e.g., a first element) is referred to as being operatively or communicatively coupled with/to or connected to another element (e.g., a second element), the element may be connected to the another element directly or through another element (e.g., a third element). In contrast, when an element (e.g., a first element) is referred to as being "directly coupled with/to" or "directly connected to" another element (e.g., a second element), there are no intervening element (e.g., a third element) between the element and the another element.

The term used herein "configured to (or designed to)" may be replaced with "suitable for", "having the capacity to", "designed to", "adapted to", "made to" or "capable of" according to situations. The term "configured to (or designed to)" may not refer to only "specifically designed to" in terms of hardware. Instead of this, in any situation, the term "apparatus configured to" may indicate that the apparatus is "capable" along with another apparatus or components. For example, the expression "processor configured (or designed) to perform A, B, and C" may refer to a generic-purpose processor (e.g., a CPU or an application processor) that executes a private processor for performing a corresponding operation or one or more software programs stored in a memory device so as to perform corresponding operations.

The terminology used herein is for the purpose of describing particular exemplary embodiments only and is not intended to be limiting of exemplary embodiments. As used herein, the singular forms are intended to include the plural forms as well, unless the context clearly indicates otherwise. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology defined herein may not be interpreted as excluding exemplary embodiments of the present disclosure.

An electronic apparatus according to various exemplary embodiments may include at least one selected from among a smartphone, a table personal computer (PC), a mobile phone, an image phone, an e-book reader, a desktop PC, a laptop PC, a netbook computer, a workstation server, a personal digital assistant (PDA), a portable multimedia player (PMP), a Moving Picture Experts Group (MPEG) audio layer-3 (MP3) player, a mobile medical device, a camera, and a wearable device. According to the various exemplary embodiments, the wearable device may include at least one selected from among an accessary type (e.g., a watch, a ring, a bracelet, an anklet, a necklace, glasses, contact lenses, or a head-mounted device (HMD)), a fabric or clothing all-in-one type (e.g., electronic clothes), a body-attached type (e.g., a skin pad or a tattoo), and an bioimplant type (e.g., an implantable circuit).

According to at least some exemplary embodiments, the electronic apparatus may be a home appliance. The home appliance may include at least one selected from among a television (TV), a digital video disk (DVD) player, an audio device, a refrigerator, an air conditioner, a cleaner, an oven, a microwave oven, a washer, an air cleaner, a set-top box, a home automation control panel, a security control panel, a TV box (e.g., Samsung Homesync™, Apple TV™, or Google TV™), a game console (e.g. Xbox™, PlayStation™), an electronic dictionary, an electronic key, a camcorder, and an electronic picture frame.

According to another exemplary embodiment, the electronic apparatus may include at least one selected from among various types of medical devices (e.g., various types of portable medical measurement devices (e.g., a glucose monitor, a heart rate monitor, a blood pressure measurer, a body temperature measurer, etc.), magnetic resonance angiography (MRA), magnetic resonance imaging (MRI), computed tomography (CT), a camera, an ultrasonic machine, etc.), a navigation system, a global navigation satellite system (GNSS), an event data recorder (EDR), a flight data recorder (FDR), a car infotainment device, marine electronic equipment (e.g., a marine navigation system, a gyro compass, or the like), an avionics system, a security device, a car head unit, an industrial or home robot, an automatic teller's machine (ATM) of a financial institution, point of sales (POS) of a shop, and an Internet of Things (IoT) device (e.g., a bulb, various types of sensors, an electric or gas meter, a sprinkler, a fire alarm, a thermostat, a streetlamp, a toaster, sports equipment, a hot-water tank, a heater, a boiler, or the like)

According to some exemplary embodiments, the electronic apparatus may include at least one selected from among a part of furniture or building/structure, an electronic board, an electronic signature receiving device, a projector, and various types of measurement devices (e.g., waterworks, electricity, gas, or electromagnetic wave measurement device, etc.). According to various exemplary embodiments, the electronic apparatus may be one of various types of apparatuses described above or a combination thereof. According to an exemplary embodiment, an electronic apparatus may be a flexible electronic apparatus. Also, an electronic apparatus according to an exemplary embodiment is not limited to the above-described apparatuses and may include new electronic apparatuses that are developed according to technological developments.

Hereinafter, an electronic apparatus according to various exemplary embodiments will be described with reference to the attached drawings. The term "user" used herein may be referred to as an apparatus (e.g., an artificial intelligence (AI) electronic apparatus).

FIG. 1 is a block diagram illustrating an electronic apparatus 10 according to an exemplary embodiment. Referring to FIG. 1, the electronic apparatus 10 includes a communicator 11, a memory 15, an input interface 17, and a processor 13.

The communicator 11 may be connected to a network through a wire-wireless interface and transmit or receive data with another electronic apparatus or a server. For example, the communicator 11 may receive data about a part of a thing or a human body capable of including security information from an external server. The communicator 11 may include a combination of hardware and software.

The memory 15 may store a program and data. For example, the memory 15 may store an image database (DB) of the part of an item or the human body capable of including the security information.

The processor 13 may receive a user command of sharing a content, search the content for a region including security information based on the user command, extract an image corresponding to the security information from the searched region, identify the security information from the image, and determine whether to transform the image, based on the identified security information. If the security information is identified, the processor 13 may transform the image corresponding to the security information. In particular, the processor 13 may determine a type of the identified security information and transform or modify the image based on the type of the identified security information. According to an exemplary embodiment, the type of the security information may be at least one selected from among a fingerprint, an iris, a number, a letter, and a pattern.

The processor 13 may change a resolution of the image corresponding to the security information or may transform the image corresponding to the security information by distorting the image corresponding to the security information. The processor 13 may also generate a second content and transmit the second content through the communicator 11 by synthesizing the transformed image with an existing content.

The input interface 17 may include a touch panel, a (digital) pen sensor, a key, or an ultrasonic input device. The touch panel may use at least one selected from among a capacitive type, a decompressive type, an infrared type, and an ultrasonic type. The touch panel may further include a control circuit. The touch panel may further include a tactile layer to provide a tactile layer to a user.

The (digital) pen sensor may be a part of the touch panel or may include an additional recognition sheet. The key may include a physical button, an optical key, or a keypad. The ultrasonic input device may sense ultrasonic waves, which are generated from an input tool, through a microphone to check data corresponding to the sensed ultrasonic waves.

Figure 2:
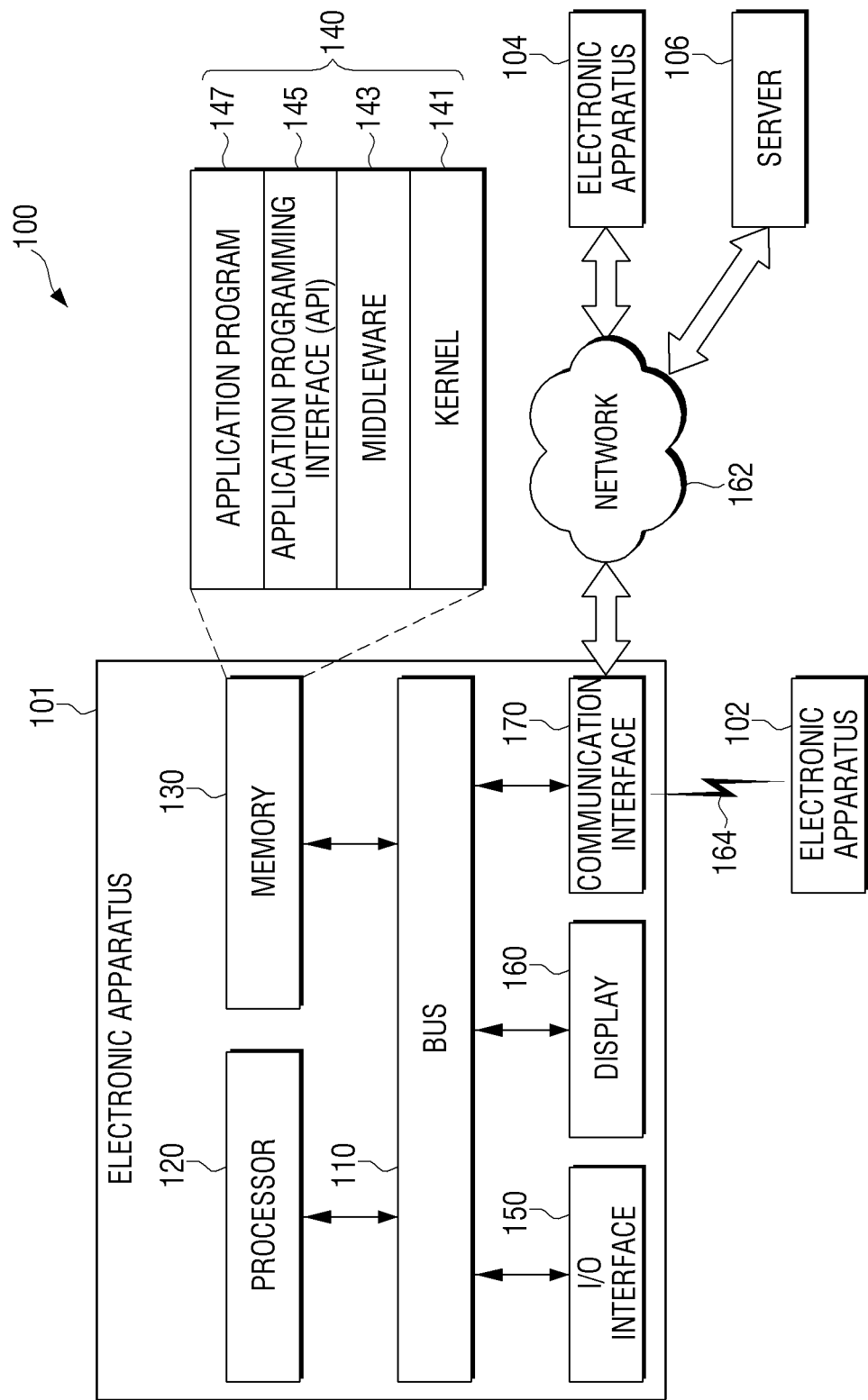
FIG. 2 is a view illustrating an electronic apparatus positioned in a network environment according to an exemplary embodiment.

FIG. 2 is a view illustrating an electronic apparatus 101 positioned in a network environment 100 according to an exemplary embodiment. The electronic apparatus 101 may include a bus 110, a processor 120, a memory 130, an input/output (I/O) interface 150, a display 160, and a communication interface 170. According to an exemplary embodiment, the electronic apparatus 101 may omit at least one selected from among elements or may additionally include other elements.

The bus 110 may include a circuit that connects elements 120 through 170 to one another and transmits communications (e.g., a control message and/or data) between the elements 120 through 170.

The processor 120 may include one or more of a central processing unit (CPU), an application processor (AP), and a communication processor (CP). The processor 120 may perform operations or data processing for controls and/or communications of at least other elements of the electronic apparatus 101.

The memory 130 may include volatile and/or nonvolatile memories. The memory 130 may store a command or data related to at least one other element of the electronic apparatus 101. According to an exemplary embodiment, the memory 130 may store software and/or program 140. For example, the program 140 may include a kernel 141, middleware 143, an application programming interface (API) 145, and/or an application program (or an application or App) 147. At least a part of the kernel 141, the middleware 143, or the API 145 may be referred to as an operating system (OS).

In particular, various types of application programs executed in the electronic apparatus 101 may generate various types of log data. The electronic apparatus 101 may store the various types of log data in the memory 130. The electronic apparatus 101 may also predict a current position and a current situation of a user by analyzing the log data. For example, the log data may include information about a date and a time, schedule information of the user, etc. The electronic apparatus 101 may predict the current position and the current location of the user by analyzing the information about the data and the time and the schedule information of the user.

The kernel 141 may control or manage system resources (e.g., the bus 110, the processor 120, the memory 130, and/or the like) used for performing operations or functions realized in other programs (e.g., the middleware 143, the API 145, and/or the application program 147). The kernel 141 may also provide an interface capable of controlling or managing the system resources by accessing individual elements of the electronic apparatus 101.

The middleware 143 may be an intermediate between the API 145 or the application program 147 and the kernel 141 so as to enable the API 145 or the application program 147 to communicate with the kernel 141 and exchange data with the kernel 141.

The middleware 143 may also process one or more task requests, which are received from the application program 147, according to priority orders. For example, the middleware 143 may give at least one of the application program 147 a priority order of using the system resources (e.g., the bus 110, the processor 120, the memory 130, or the like) of the electronic apparatus 101. For example, the middleware 143 may perform scheduling or load-balancing with respect to the one or more task requests by processing the one or more task requests according to the priority orders given to the at least one of the application program 147.

The API 145 is an interface through which the application program 147 controls a function provided from the kernel 141 or the middleware 143. For example, the API 145 may include at least one interface or function (e.g., command) for controlling a file, a window, an image, a letter, or the like.

The I/O interface 150 may operate as an interface capable of transmitting a command or data, which is input from the user or another external device, to another element (or other elements) of the electronic apparatus 101. The I/O interface 150 may also output a command or data, which is received from another element (or other elements) of the electronic apparatus 101, to the user or another external device.

The display 160 may include a liquid crystal display (LCD), a light-emitting diode (LED) display, an organic light-emitting diode (OLED) display, a microelectromechanical system (MEMS) display, or an electronic paper display. For example, the display 160 may display various types of contents (e.g., a text, an image, a video, an icon, a symbol, etc.) to the user. The display 160 may include a touch screen, for example, may receive a touch, gesture, approach, or hovering input by using an electronic pen or a part of a body of the user.

The communication interface 170 may set communications between the electronic apparatus 101 and an external apparatus (e.g., a first external apparatus 102, a second external electronic apparatus 104, and/or the server 106). For example, the communication interface 170 may be connected to a network 162 through a wireless communication and/or a wire communication to communicate with an external apparatus (e.g., the second external electronic apparatus 104 and/or the server 106).

The wireless communication may be a cellular communication protocol, e.g., may include at least one selected from among Long Term Evolution (LTE), LTE Advance (LTE-A), a Code Division Multiple access (CDMA), a wideband CDMA (WCDMA), a Universal Mobile Telecommunications System (UMTS), a Wireless Broadband (Wi-Bro), and a Global System for Mobile Communications (GSM). The wireless communication may also include a short-range communication 164. For example, the short-range communication 164 may include at least one selected from among Wireless Fidelity (WiFi), Bluetooth (BT), Near Field Communication (NFC), etc.

A Global Navigation Satellite System (GNSS) may include at least one selected from among a Global Positioning System (GPS), a Global Navigation Satellite System (Glonass), a Beidou Navigation Satellite System (hereinafter referred to as Beidou) or Galileo, and European Global Satellite-based Navigation System according to a use area, a band, or the like. Hereinafter, the "GPS" may be interchangeably used with the "GNSS". In particular, the electronic apparatus 101 may determine the current position of the user by using the GPS.

The wire communication may include at least one selected from among a USB, a High Definition Multimedia Interface (HDMI), Recommended Standard 232 (RS-232), and a Plain Old Telephone Service (POTS). The network 162 may include a telecommunications network, e.g., may include at least one selected from among a computer network (e.g., LAN or WAN), Internet, and a telephone network.

The first and second external electronic apparatuses 102 and 104 may be the same types of apparatuses as or different types of apparatuses from the electronic apparatus 101. According to an exemplary embodiment, the server 106 may include a group of one or more servers. According to various exemplary embodiments, all or some of operations performed in the electronic apparatus 101 may be performed in another electronic apparatus and/or a plurality of electronic apparatuses (e.g., the first and second electronic apparatuses 102 and 104 or the server 106). According to an exemplary embodiment, if the electronic apparatus 101 is to perform a function or a service automatically or at a request, the electronic apparatus 101 may additionally request at least a part of the function related to the function or the service from another electronic apparatus (e.g., the first or second electronic apparatus 102 or 104 or the server 106) instead of performing the function or the service. Another electronic apparatus (e.g., the first or second electronic apparatus 102 or 104 or the server 106) may perform a requested function or an additional function and transmit the performance result to the electronic apparatus 101. The electronic apparatus 101 may provide a requested function or service by processing the received performance result as it is or additionally. For this, a cloud computing, distributed computing, and/or client-server computing technology may be used.

Figure 3:
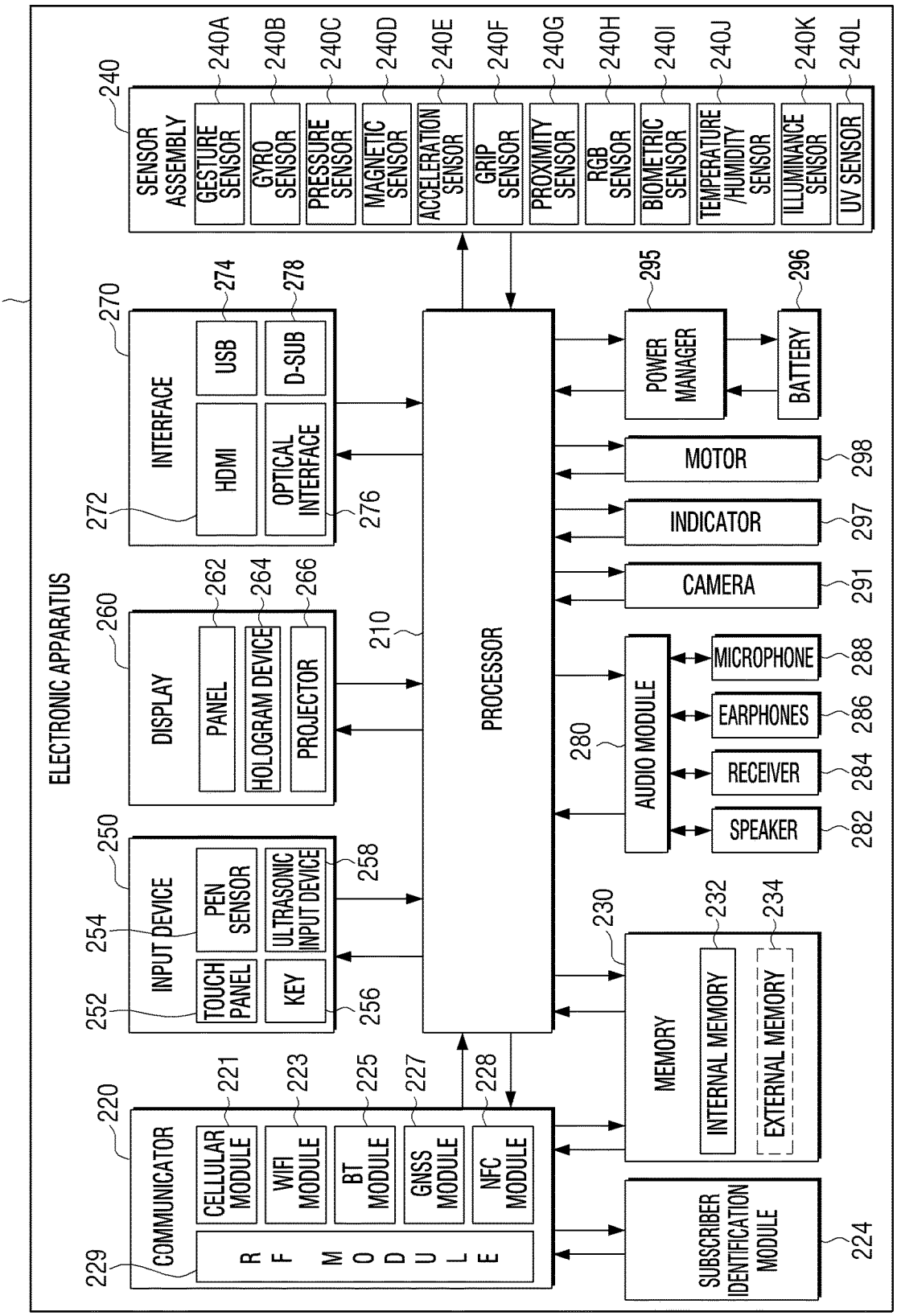
FIG. 3 is a block diagram illustrating a detailed configuration of an electronic apparatus according to an exemplary embodiment.

FIG. 3 is a block diagram of a detailed configuration of an electronic apparatus 201 according to an exemplary embodiment. For example, the electronic apparatus 201 may include all or some of elements of the electronic apparatus 101 of FIG. 1. The electronic apparatus 201 may include one or more processors 210 (e.g., an AP), a communicator 220, a subscriber identification module 224, a memory 230, a sensor assembly 240, an input device 250, a display 260, an interface 270, an audio module 280, a camera 291, a power manager 295, a battery 296, an indicator 297, and a motor 298.

The processor 210 may control a plurality of hardware or software elements connected to the processor 210 and perform various types of data processing and operations by driving an OS or an application program. The processor 210 may be realized as a System on Chip (SoC). According to an exemplary embodiment, the processor 210 may further include a graphic processing unit (GPU) and/or an image signal processor. The processor 210 may include at least some elements of FIG. 2. The processor 210 may load a command or data, which is received from at least one of other elements (e.g., nonvolatile memories), into a volatile memory, process the command or data, and store various types of data in a nonvolatile memory.

The communicator 220 may have the same as or similar configuration to the communicator 11 of FIG. 1, according to an exemplary embodiment. The communicator 220 may include the cellular module 221, a WiFi module 223, a Bluetooth (BT) module 225, a GNSS module 227 (e.g., a GPS module, a Glonass module, a Beidou module, or a Galileo module), an NFC module 228, and a radio frequency (RF) module 229. In an exemplary embodiment, the communicator 220 enables cellular, WiFi, Bluetooth, and so on communications using various modules set forth therein.

The cellular module 221 may provide a voice call, a video call, a letter service, an Internet service, or the like. According to an exemplary embodiment, the cellular module 221 may identify and authenticate the electronic apparatus 201 in a communication network by using the subscriber identification module 224 (e.g., a Subscriber Identity Module (SIM) card). According to an exemplary embodiment, the cellular module 221 may perform at least some of functions that may be provided by the processor 210. According to an exemplary embodiment, the cellular module 221 may include a CP.

The WiFi module 223, the BT module 225, the GNSS module 227, or the NFC module 228 may include a processor for processing data transmitted and/or received through a corresponding module. According to an exemplary embodiment, at least some (e.g., two or more) of the cellular module 221, the WiFi module 223, the BT module 225, the GNSS module 227, and the NFC module 228 may be included in one integrated chip (IC) or an IC package.

The RF module 229 may transmit and/or receive a communication signal (e.g., an RF signal). The RF module 229 may include a transceiver, a power amp module (PAM), a frequency filter, a low noise amplifier (LNA), an antenna, or the like. According to another exemplary embodiment, at least one selected from among the cellular module 221, the WiFi module 223, the BT module 225, the GNSS module 227, and the NFC module 228 may transmit and/or receive an RF signal through an additional RF module.

The subscriber identification module 224 may include a card and/or an embedded SIM including subscriber identification modules and may include unique identification information (e.g., an integrated circuit card identifier (IC-CID)) or subscriber information (e.g., an international mobile subscriber identity (IMSI)) according to an exemplary embodiment.

The memory 230 (e.g., the memory 130) may include an internal memory 232 or an external memory 234. The internal memory 232 may include at least one selected from a volatile memory (e.g., a dynamic random access memory (DRAM), a static RAM (SRAM), a synchronous DRAM (SDRAM), or the like), a nonvolatile memory (e.g., an one time programmable read only memory (OTPROM), a programmable ROM (PROM), an erasable and programmable ROM (EPROM), an electrically erasable and programmable ROM (EEPROM), a mask ROM, a flash ROM, or the like), a flash memory (e.g., NAND flash, NOR flash, or the like), a hard drive, and a solid state drive (SSD).

The external memory 234 may include a flash drive, e.g., may further include compact flash (CF), secure digital (SD), micro secure digital (Micro-SD), mini secure digital (Mini-SD), extreme digital (xD), a multimedia card (MMC), a memory stick, or the like. The external memory 234 may be functionally and/or physically connected to the electronic apparatus 201 through various types of interfaces.

The sensor assembly 240 may measure a physical quantity or may sense an operation state of the electronic apparatus 201 and convert measured or sensed information into an electrical signal. The sensor assembly 240 may include at least one selected from among a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illuminance sensor 240K, and an ultraviolet (UV) sensor 240L. The sensor assembly 240 may additionally or alternatively include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor assembly 240 may further include a control circuit for controlling at least one or more sensors belonging to the sensor assembly 240. According to an exemplary embodiment, the electronic apparatus 201 may further include a processor configured as a part of the processor 210 or separately from the processor 210 to control the sensor module 240 and may control the sensor module 240 while the processor 210 is in a sleep state.

The input device 250 may include a touch panel 252, a (digital) pen sensor 254, a key 256, and an ultrasonic input device 258. The touch panel 252 may use at least one selected from among a capacitive type, a decompressive type, an IR type, and an ultrasonic type. The touch panel 252 may further include a control circuit. The touch panel 252 may further include a tactile layer to provide a tactile reaction to a user.

The (digital) pen sensor 254 may be a part of the touch panel 252 or may include an additional recognition sheet. The key 256 may include a physical button, an optical key, or a keypad. The ultrasonic input device 258 may sense ultrasonic waves, which are generated from an input tool, through a microphone 288 and check data corresponding to the sensed ultrasonic waves.

The display 260 (e.g., the display 160) may include a panel 262, a hologram device 264, and a projector 266. The panel 262 may be realized to be flexible, transparent, or wearable. The panel 262 may be integrated into one module along with the touch panel 252. The hologram device 264 may show a 3-dimensional (3D) image into air. The projector 266 may display an image by projecting light onto a screen. The screen may be positioned inside or outside the electronic apparatus 201. According to an exemplary embodiment, the display 260 may further include a control circuit for controlling the panel 262, the hologram device 264, and/or the projector 266.

The interface 270 may include an HDMI 272, a USB 274, an optical interface 276, and D-subminiature (D-sub) 278. The interface 270 may be included in the communicator 11 of FIG. 1 according to one exemplary embodiment. The interface 270 may additionally or alternatively include a mobile high-definition link (MHL) interface, a secure digital (SD) card/multimedia card (MMC) interface, or an infrared data association (IrDA) standard interface.

The audio module 280 may bidirectionally convert a sound and an electrical signal. At least some elements of the audio module 280 may be included in the input interface 17 of FIG. 1, according to an exemplary embodiment. The audio module 280 may process sound information that is input or output through a speaker 282, a receiver 284, earphones 286, the microphone 288, or the like.

The camera 291 is an apparatus capable of capturing a still image and/or a moving image. According to an exemplary embodiment, the camera 291 may include one or more image sensors (e.g., a front sensor or a rear sensor), a lens, an image signal processor (ISP), or flash (e.g., LED, a xenon lamp, or the like).

The power manager 295 may manage power of the electronic apparatus 201. According to an exemplary embodiment, the power manager 295 may include a power management integrated circuit (PMIC), a charger integrated circuit (IC), or a battery or fuel gauge. The PMIC may have a wire and/or wireless charging method. The wireless charging method may include a magnetic resonance method, a magnetic induction method, an electromagnetic method, or the like and may further include an additional circuit for wireless charging, e.g., a coil loop, a resonance circuit, a rectifier, or the like. The battery gauge may measure a residual amount of the battery 296 and a voltage, a current, or a temperature when charging the battery 296. The battery 296 may include a rechargeable battery and/or a solar battery.

The indicator 297 may display a particular state of the electronic apparatus 201 or a part of the electronic apparatus 201 (e.g., the processor 210), e.g., a booting state, a message state, a charging state, or the like. The motor 298 may convert an electrical signal into a mechanical vibration and may generate a vibration or haptic effect or the like. Although not shown in FIG. 3, the electronic apparatus 201 may include a processing apparatus (e.g., a GPU) for supporting a mobile TV. The processing apparatus for supporting the mobile TV may process media data according to a digital multimedia broadcasting (DMB), digital video broadcasting (DVB), or mediaFlo™ standard, or the like.

Each of elements described herein may include one or more components, and a name of a corresponding element may vary according to a type of an electronic apparatus. According to various exemplary embodiments, the electronic apparatus may include at least one selected from among the elements described herein and may omit some of the elements or further include additional other elements. Also, some of the elements of the electronic apparatus according to the various exemplary embodiments may be combined into one entity so as to equally perform functions of the corresponding elements that are uncombined.

Exemplary embodiments disclosed herein are provided to describe and understand described contents and do not limit the scope of a technology described herein. Therefore, the scope of an inventive concept may be construed as including all modifications based on a technical spirit of the disclosure and/or various exemplary embodiments.

FIG. 4 is a view illustrating processing of content which includes security information according to an exemplary embodiment. Referring to FIG. 4, a first content 400, a security information region detector module 401, a candidate region management module 403, a security information image database (DB) 405, a security information detector module 411, a security information type management module 413, a security information type DB 415, a security information verifier module 421, a pattern management module 423, a security information pattern DB 425, a content transcoder module 431, and second content 440 are described according to an exemplary embodiment. These modules may be stored in a memory 230 and may be a program code according to an exemplary embodiment.

The first content 400 may be an original image that is not transformed, modified, or edited. The first content 400 may include security information in at least one region of the first content 400 e.g., in a region or a portion of the image. The first content 400 may be an image on which a finger of a human is displayed according to an exemplary embodiment.

The security information region detector module 401 may detect a region capable of including security information from the first content 400. For example, a security information region included in the first content 400 may be a region where a finger is displayed. The security information region may be a region where an image (hereinafter referred to as a security information image) capable of including security information is displayed. The security information image may be a pupil, a finger, a minor, glasses, or glass that may directly or indirectly include security information. These are provided by way of an example only and not by way of a limitation. The image which directly includes the security information may be an image that includes a pupil, a finger, a pattern lock, letter type passwords, or the like, which may be identified and/or identifiable from the image. The image which indirectly includes the security information may be an image that includes security information projected onto a minor, glasses, an external appearance of an electronic apparatus, or the like. A fingerprint, a face, and a pupil may not be identified just from looking at the external appearance of the electronic apparatus, the minor, the glasses, or the like included in the image. However, even if the fingerprint, the face, and pupil are identified through post-processing, the image may indirectly include security information.

A security information image may include security information. For example, the pupil may include an iris, and the finger may include a fingerprint. The pupil and the finger may be reflected from and displayed on the mirror and the glasses, and the iris and the fingerprint may be identified through the pupil and the finger reflected from the mirror. Also, the iris and the fingerprint may be identified through the pupil and the finger reflected from the glasses.

The candidate region management module 403 may manage an image characteristic of a candidate region where a security information image read from the security information image DB 405 may be included. The image characteristic may be identified through a hash value, a filter value, a template, or the like according to an exemplary embodiment.

The candidate region where the security information image may be included, for example, may be a palm, a face, a mirror, an external appearance of an electronic apparatus, glasses, glass, or an external appearance of a car. The security information image DB 405 may be continuously updated.

The security information detector module 411 may detect security information from the security information region with reference to a security information type provided from the security information type management module 413. For example, the security information detector module 411 may detect a fingerprint included in a finger from a mirror image.

The security information type management module 413 may manage information about a security information type read from the security information type DB 415 storing the security information type and provide the security information detector module 411 with the information about the security information type. An image or a portion of the content having the security information may be changed differently based on the determined type of the security information. For example, a portion of an image may be distorted or changed for a first type of security information, a resolution of the image may be changed for a second type of security information, and a portion of an image may be substituted with another image for a third type of security information.

The security information type DB 415 may store information about a type of security information. For example, the security information type DB 415 may store a fingerprint, number/letter combined passwords, and a lock pattern. The security information type DB 415 may be continuously updated.

The security information verifier module 421 may determine whether security information detected from the security information detector module 411, e.g., a fingerprint, an iris, number/letter combination letter string, or a lock pattern, is valid security information. In other words, the security information verifier module 421 may determine whether the detected security information includes information enough to succeed in an authentication through an external system or a service capable of using security information, e.g., an iris recognition system, a web service login, a payment service, or a mobile screen lock. A method of determining whether the detected security information is valid may compare whether security information restored through an image processing, filtering, pattern restoring technology is equal or similar to security information pattern data.

The pattern management module 423 reads a security information pattern from the security information pattern DB 425 and manages the read security information pattern. The pattern management module 423 may provide the read security information pattern to the security information verifier module 421.

The security information pattern DB 425 may store a pattern of the security information. The security information pattern DB 425 may store several types of patterns of a fingerprint, several types of patterns of an iris, several types of patterns of numbers, several types of patterns of letters, and number/letter combination rules, and lock patterns but is not limited thereto. A pattern does not mean fixed information but may refer to a rule for determining a type of information. For example, if a security information image is a consecutive numeral string, the pattern may refer to a template, a regular expression, and an image characteristic for determining that the security information image is the consecutive numeral string.

The content transcoder module 431 may transform the security information identified from the first content 400. For example, if a fingerprint is identified as security information from the first content 400, the content transcoder module 431 may delete the security information from the first content 400 or transform the security information by lowering or distorting a resolution of an image of a region corresponding to the fingerprint.

The second content 440 may be an image in which the security information of the region in which the security information is identified is transformed or modified.

The security information image DB 405, the security information type DB 415, and the security information pattern DB 425 may be provided as separate DB forms or as one integrated DB form and may be continuously updated. The electronic apparatus 201 may update the security information image DB 405, the security information type DB 415, and the security information pattern DB 425 by receiving related data from the server 106 according to an exemplary embodiment.

FIGS. 5A through 7 are views illustrating generating a second content from which security information is deleted when sharing a content in the electronic apparatus 201, according to an exemplary embodiment. Here, the content from which the security information is deleted may include an image that corresponds to the security information and is transformed or distorted in the content prepared for the sharing.

Figure 5A:
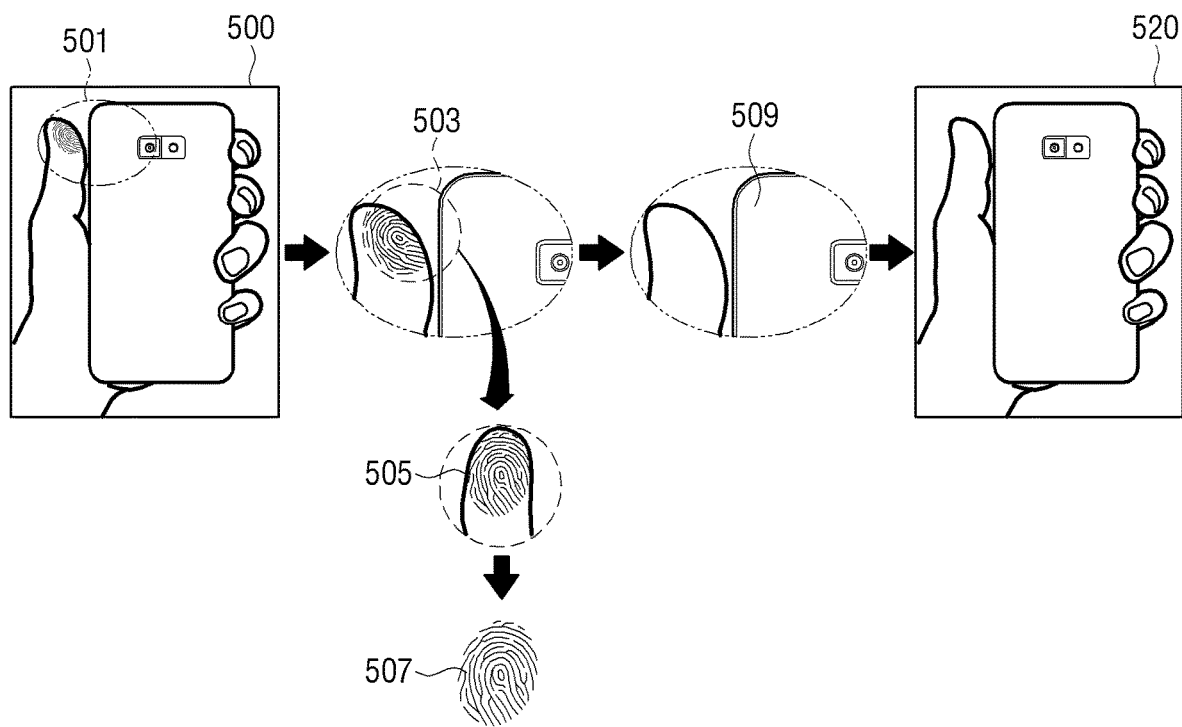
FIGS. 5A through 7 are views illustrating generation of second content from which security information is deleted, by using an electronic apparatus, according to an exemplary embodiment.

Referring to FIG. 5A, a first content 500 and a second content 520 are illustrated according to an exemplary embodiment. The first content 500 may include security information. For example, the first content 500 may include a hand of a human and display a fingerprint that may be security information. If a finger region 501 is enlarged in the first content 500, a fingerprint of the finger may be identified. The processor 210 receives the first content 500 and searches the first content 500 to detect a security information region within the first content. In detail, according to an exemplary embodiment, the processor 210 may be provided with information about a security information candidate region provided from the candidate region management module 403, i.e., a security information image, scan content, and search for a security information region. The security information image may be a pupil, finger, mirror, glasses, or glass image.

If the security information region is detected in the first content 500, the processor 210 may determine a type of security information through the security information detector module 411. The type of security information may be a fingerprint, an iris, number/letter combined passwords, or a lock pattern. These types are provided by way of an example only and not by way of a limitation.

The processor 210 may detect a finger 503 in the first content 500 through the security information detector module 411, determine that the type of the security information is a finger 505, and identify a fingerprint 507 included in the finger 505 so as to detect security information.

If the security information is detected in the first content 500, the processor 210 may generate the second content 520 from which the security information is deleted and/or extracted, by transforming a portion of the image which corresponds to the security information. For example, the processor 210 may generate the second content 520 in which the security information is deleted, by transforming an image part corresponding to the fingerprint 507 of the finger 505 of the first content 500 into another pattern 509. The processor 210 may delete the security information from the first content 500 by lowering or distorting a resolution of an image of a region corresponding to the fingerprint 507 identified as the security information in the first content 500 through the content transcoder module 431.

According to an exemplary embodiment, the processor 210 may verify whether the security information identified in the first content 500 is capable of unlocking the electronic apparatus 201. The processor 210 may compare the security information identified in the first content 500 with a security information pattern stored in the security information pattern DB 425. If it is determined that the identified security information corresponds to the security information pattern stored in the security information pattern DB 425, according to the comparison result, the processor 210 may generate the second content 520 in which the security information is deleted, by transforming, modifying, editing and/or distorting the portion of the image corresponding to the security information in the first content 500 i.e., the image corresponding to the security information found in the first content 500. However, if the identified security information does not correspond to the security information pattern stored in the security information pattern DB 425, the processor 210 may refrain from and not transform the first content 500 and may refrain from and not generate the second content 520. In other words, the processor 210 may determine whether to generate the second content 520, based on the security information identified from the first content 500. In an exemplary embodiment, the processor 210 may determine to not generate or omit the generating of the second content if the security information cannot be obtained from the detected security information region.

Figure 5B:
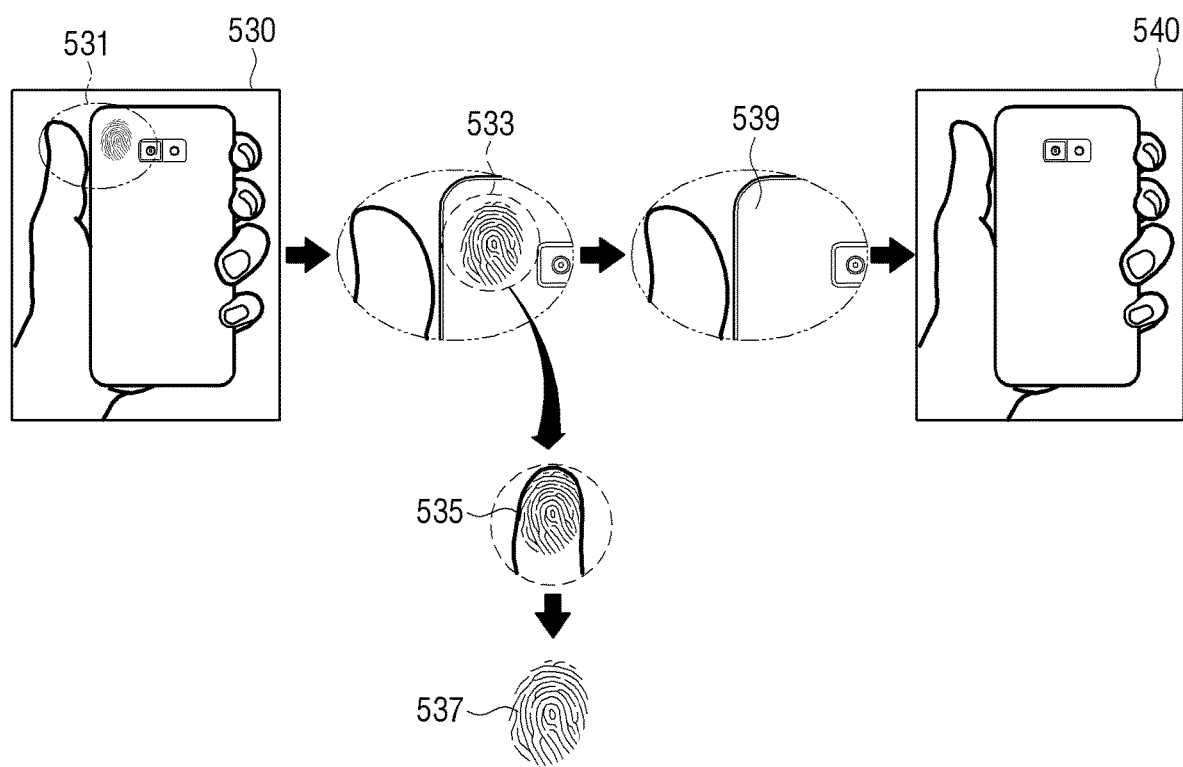

Referring to FIG. 5B, a fingerprint of a user is visible on an apparatus part of a first content 530. For example, the fingerprint which is an example of security information may be displayed on the apparatus part of the first content 530. If a region 531 where the fingerprint is displayed is enlarged in the first content 530, the fingerprint placed on the apparatus part may be identified. The processor 210 receives the first content 530 and searches the first content 530 for a security information region. In detail, according to an exemplary embodiment, the processor 210 may be provided with information about a security information candidate region from the candidate region management module 403, i.e., a security information image, scan content, and search for a security information region. For example, the security information image may be a pupil, finger, mirror, glasses, or glass image, and a front and back surface of an apparatus. These are provided by way of an example only and not by way of a limitation.

If the security information region is detected from the first content 530, the processor 210 may determine a type of the security information through the security information detector module 411. For example, the type of the security information may be a fingerprint, an iris, number/letter combined passwords, or a lock pattern.

The processor 210 may detect a back surface of the apparatus from the first content 530 through the security information detector module 411 and identify a fingerprint 537 placed on the apparatus so as to detect security information.

If the security information is detected from the first content 530, the processor 210 may generate a second content 540 from which the security information is deleted, by transforming or modifying an image corresponding to the security information i.e., modifying a portion or part of the original image 530 in which the security information was detected. For example, the processor 210 may generate the second content 540 from which the security information is deleted, by transforming, editing, and/or modifying an image part corresponding to the fingerprint 537 into another pattern 539 in the first content 530. The processor 210 may delete the security information from the first content 530 by lowering or distorting a resolution of an image of a region corresponding to the fingerprint 537 identified as the security information from the first content 530 through the content transcoder module 431 according to an exemplary embodiment.

The processor 210 may verify whether the security information identified from the first content 530 is capable of unlocking the electronic apparatus 201. The processor 210 may compare the security information identified in the first content 530 with a security information pattern stored in the security information pattern DB 425. If it is determined that the identified security information corresponds to the security information pattern stored in the security information pattern DB 425, according to the comparison result, the processor 210 may generate the second content 540 from which the security information is deleted, by transforming, modifying, editing, and/or distorting an image corresponding to the security information in the first content 530 i.e., by modifying and/or distorting a portion of the original image where the security information is detected. However, if the identified security information does not correspond to the security information pattern stored in the security information pattern DB 425, the processor 210 may not transform and/or refrain from changing/modifying the first content 530 and may refrain from and not generate the second content 540. In other words, the processor 210 may determine whether to generate the second content 540, based on the security information identified from the first content 530. In an exemplary embodiment, the processor 210 may determine not to generate, to avoid and/or skip generating the second content 540 based on whether the security information is identified in the detected security region.

Figure 6:
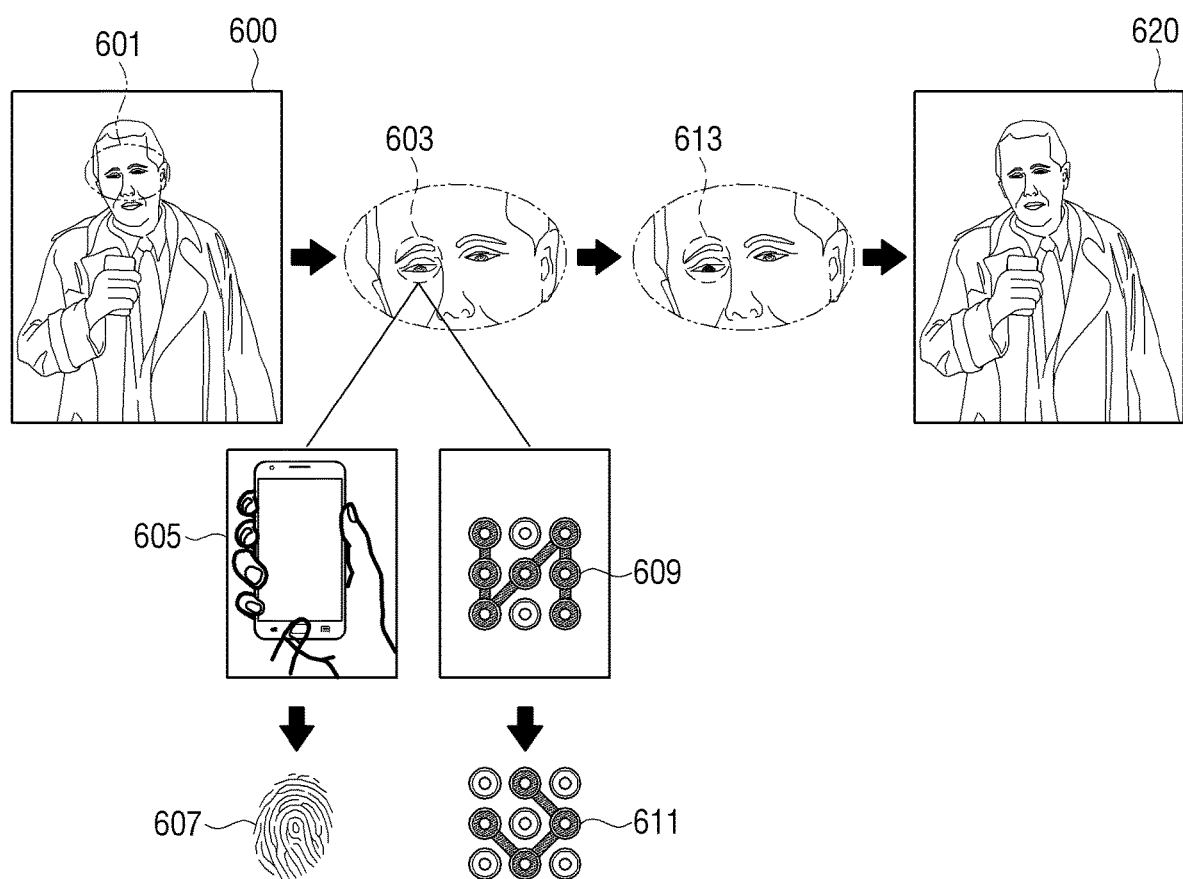

Referring to FIG. 6, a first content 600 and a second content 620 are illustrated according to an exemplary embodiment. The first content 600 may include security information. For example, the first content 600 may include a face 601 of a user, and a fingerprint 605 of the user and a lock pattern 609 that may be security information and may be reflected from and displayed on a pupil part 603 included in the face 601 according to an exemplary embodiment. If the pupil part 603 of the user displayed in the first content 600 is enlarged, the fingerprint 605 of the user or the lock pattern 609 that is reflected from and displayed on a pupil may be identified. The processor 210 receives the first content 600 and searches the first content 600 for a security information region. In detail, according to an exemplary embodiment, the processor 210 may be provided with information about a security information candidate region provided from the candidate region management module 403, i.e., a security information image, scan the first content 600, and search for the security information region or regions. For example, the security information image may be a pupil, a finger, a mirror, glasses, or a glass image.

If the security information region is detected in the first content 600, the processor 210 may determine a type of the security information through the security information detector module 411 for each detected security information region. For example, the type of the security information may be a fingerprint, an iris, number/letter combined passwords, and/or a lock pattern.

The processor 210 may detect the pupil 603 from the first content 600 through the security information detector module 411 and identify the fingerprint 605 and the lock pattern 609 that are reflected from and displayed on the pupil 603 so as to detect security information 607 and 611.

If the security information is detected from the first content 600, the processor 210 may generate the second content 620 from which security information is deleted, by transforming images corresponding to the security information 607 and 611 i.e., by modifying, editing, changing, and/or transforming portions of the first content 600 in which the security information is identified. For example, the processor 210 may generate the second content 620 from which the security information is deleted, by transforming and/or modifying and/or changing an image part corresponding to the pupil in the first content 600. The processor 210 may delete the security information 607 and 611 from the first content 600 by lowering or distorting a resolution of an image of a region corresponding to the fingerprint 605 or the lock pattern 609 reflected from the pupil identified as security information from the first content 600 through the content transcoder module 431.

The processor 210 may verify whether the security information 607 and 611 identified in the first content 600 is capable of unlocking the electronic apparatus 201. The processor 210 may compare the security information 607 and 611 found in the first content 600 with a security information pattern stored in the security information pattern DB 425. If it is determined that the identified security information 607 and 611 corresponds to the security information pattern stored in the security information pattern DB 425, according to the comparison result, the processor 210 may generate the second content 620 from which the security information 607 and 611 is deleted, by transforming, modifying, changing and/or distorting images corresponding to the security information 607 and 611 in the first content 600. However, if the identified security information 607 and 611 does not correspond to the security information pattern stored in the security information pattern DB 425, the processor 210 may not transform the first content 600 and may not generate the second content 620. In other words, the processor 210 may determine whether to generate or not generate the second content 620, based on the security information 607 and 611 identified from the first content 600. In an exemplary embodiment, the processor 210 may determine to refrain from, omit generation of the second content 620 based on a determination that the security information 607 and 611 does not correspond to the security information pattern stored in the security information pattern DB 425. In other words, although a security information region was detected e.g., a pupil and/or a finger, the security information such as a fingerprint cannot be extracted and/or detected from the image of a finger and accordingly, the generation of the second content is determined to be unnecessary and is omitted such that the original content is provided for the sharing. According to an exemplary embodiment, it is possible that when two security information regions 603 and 605 are identified, each one is processed separately such that the second content 620 may include a modified image for the security information region 603 and not for the security information region 605. That is, if the security information region 605 does not include the security information pattern, the second content 620 maybe generated with the modified, changed security information region 603 only.

Figure 7:
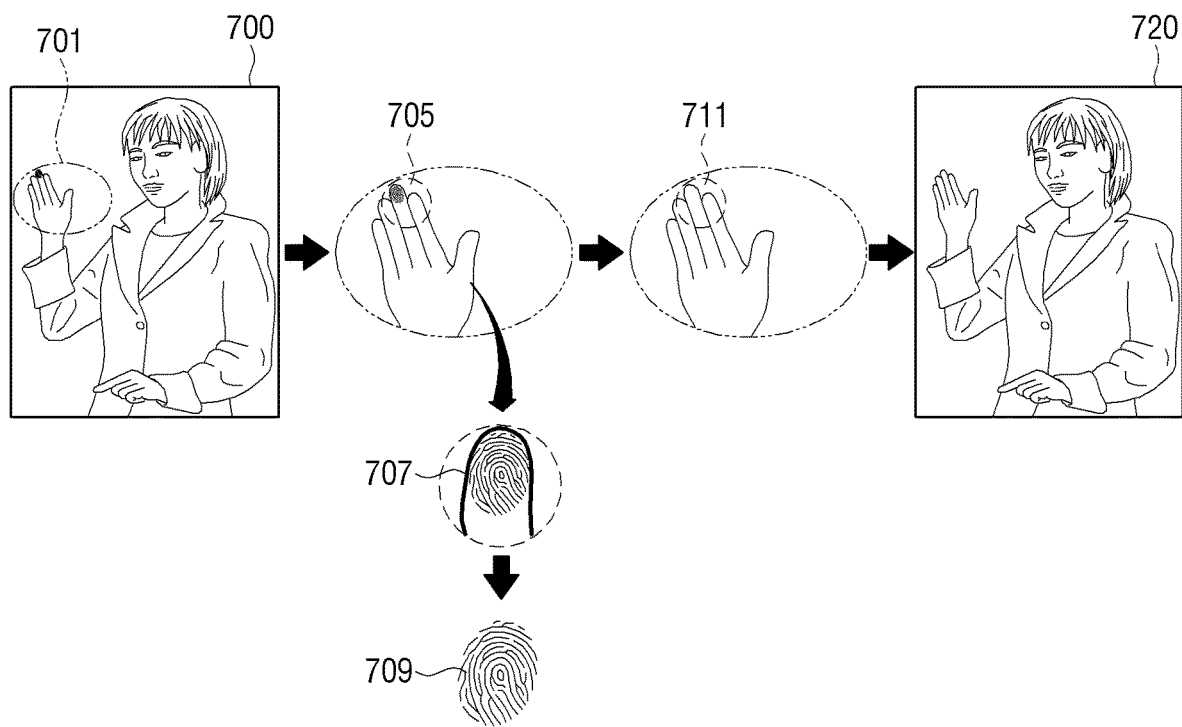

Referring to FIG. 7, a first content 700 and a second content 720 are illustrated according to an exemplary embodiment. The first content 700 may include security information. For example, the first content 700 may include a hand 705 of a human, and a fingerprint 707 that may be security information and may be displayed in the first content 700. If a finger region 701 is enlarged in the first content 700, the fingerprint 707 of a finger may be identified. The processor 210 may receive the first content 700 and search the first content 700 for a security information region. In detail, the processor 210 may be provided with information about a security information candidate region from the candidate region management module 430, i.e., a security information image, scan the first content 700, and search for the security information region. For example, the security information image may be a pupil, finger, minor, glasses, or glass image.

If the security information region 701 is detected in the first content 700, the processor 210 may determine a type of the security information using the security information detector module 411. For example, the type of the security information may be a fingerprint, an iris, number/letter combined passwords, or a lock pattern.

The processor 210 may detect a finger in the first content 700 using the security information detector module 411, determine that the type of the security information is the fingerprint 707, and identify the fingerprint 707 included in the finger so as to detect security information 709.

If the security information is detected in the first content 700, the processor 210 may generate the second content 720 in which the security information is deleted, by transforming and/or modifying an image corresponding to the security information. For example, the processor 210 may generate the second content 720 in which the security information is deleted, by transforming and/or modifying an image part corresponding to the fingerprint 707 of the finger into another pattern 711. The processor 210 may delete the security information 709 from the first content 700 by lowering or distorting a resolution of an image of a region corresponding to the fingerprint 707 identified as the security information from the first content 700 through the content transcoder module 431. According to another exemplary embodiment, the processor 210 may delete the security information 709 from the first content by substituting an image of a region corresponding to the fingerprint 707 identified as the security information with another image obtained from a database. According to yet another exemplary embodiment, the processor 210 may delete the security information 709 from the first content by distorting and/or lowering a resolution of only one or more portions of an image of a region corresponding to the fingerprint 707.

The processor 210 may verify whether the security information 709 identified in the first content 700 is capable of unlocking the electronic apparatus 201 by way of an example. The processor 210 may compare the security information identified in the first content 700 with a security information pattern stored in the security information pattern DB 425. If it is determined that the identified security information 709 corresponds to the security information pattern stored in the security information pattern DB 425, according to the comparison result, the processor 210 may generate the second content 720 in which the security information is deleted, by transforming, modifying and/or distorting an image corresponding to the security information 709 in the first content 700. However, if the identified security information 709 does not correspond to the security information pattern stored in the security information pattern DB 425, the processor 210 may refrain from, omit, and not transform or modify the first content 700 and may refrain from, omit, and not generate the second content 720. In other words, in an exemplary embodiment, the processor 210 may determine whether to generate or not generate the second content 720, based on the security information identified in the first content 700. In an exemplary embodiment, the processor may determine to not generate the second content 720, in response to determining that the security information 709 does not correspond to the security information pattern stored in the security information pattern DB 425.

Figure 8:
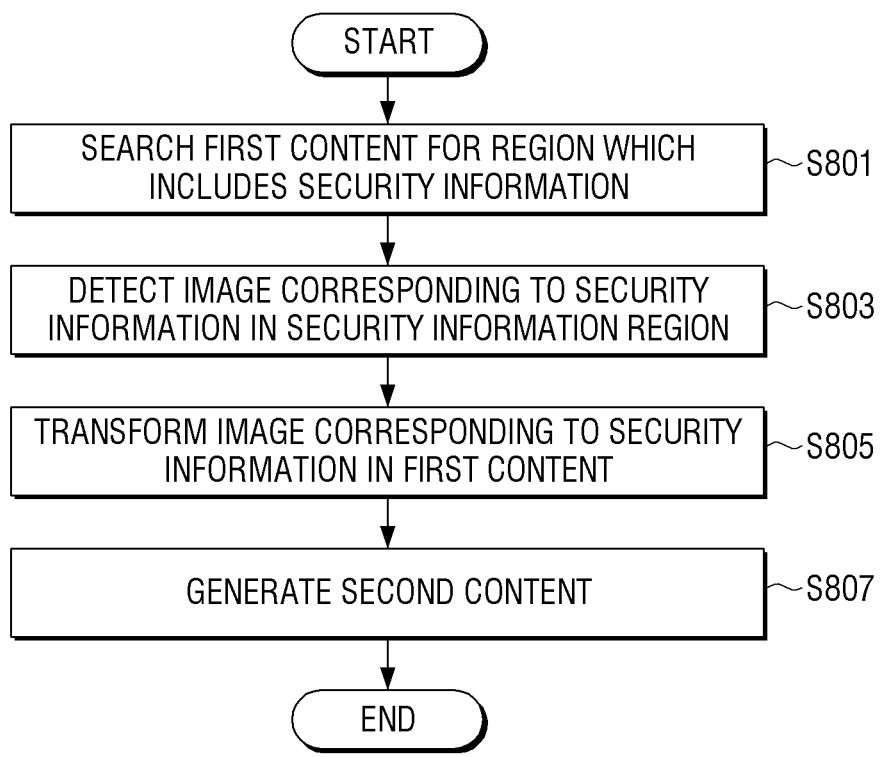
FIG. 8 is a flowchart illustrating a process of deleting security information included in content, by using an electronic apparatus, according to an exemplary embodiment.

FIG. 8 is a flowchart illustrating a process of deleting security information included in content by using the electronic apparatus 10, according to an exemplary embodiment.

In operation S801, the electronic apparatus 10 may search a first content for a region which includes security information. The electronic apparatus 10 may search for the region which includes the security information with reference to a DB that stores an image of a part of an item or a human body capable of including security information. The region which includes the security information may be referred to as a security information region and may be an image capable of having security information. For example, the region which includes the security information may be a region where a pupil, a finger, a mirror, glasses, glass, or the like is displayed and may be updated through communications. The DB may be stored in the electronic apparatus 10. Alternatively, the DB may be stored outside the electronic apparatus 10. For example, the DB may be stored in an external server, and the electronic apparatus 10 may search for the security information region with reference to a security information image provided from a server through the communicator 11 when searching for the security information region.

In operation S803, the electronic apparatus 10 may detect an image corresponding to security information in the security information region i.e., in the region detected as a candidate for having the security information. The electronic apparatus 10 may determine a type of the security information included in the detected region of the first content. In detail, the electronic apparatus 10 may determine the type of the security information with reference to fingerprint, iris, number, letter, or lock pattern information stored in the security information type DB 415.

In operation S805, the electronic apparatus 10 may identify the security information based on the type of the security information identified in the first content and transform and/or modify an image corresponding to the security information. For example, if the type of the security information identified in the first content is a fingerprint, the electronic apparatus 10 may distort a pattern of the fingerprint or lower a resolution of the fingerprint portion of the image. If the type of the security information identified from the first content is numbers, the electronic apparatus 10 may replace the numbers with other numbers.

In operation S807, the electronic apparatus 10 may generate a second content by synthesizing the transformed and/or modified image with the first content. Alternatively, the electronic apparatus 10 may generate the second content by transforming and/or modifying an image part corresponding to the security information in the first content without a process of synthesizing the transformed and/or modified image with the first content.

FIG. 9 is a flowchart illustrating a process of automatically deleting security information from content and then sharing the content if the electronic apparatus 10 shares the content, according to an exemplary embodiment.

In operation S901, the electronic apparatus 10 may search content for a region which includes security information based on a user command requesting that the content is shared e.g., requesting a transmission and/or posting of the content. The region which includes the security information may be referred to as a security information region. For example, if a user inputs a command requesting sharing the content into the electronic apparatus 10, the electronic apparatus 10 may search the content for the security information region or regions. In detail, the electronic apparatus 10 may search the content for the security information region with reference to a security information image DB.

In operation S903, the electronic apparatus 10 may extract an image corresponding to the security information in the found region. For example, the electronic apparatus 10 may extract a finger part from the content where the finger of the user is displayed.

In operation S905, the electronic apparatus 10 may identify the security information from the image corresponding to the security information. In detail, the electronic apparatus 10 may determine a type of the security information and identify the security information with reference to security information type information stored in the security information type DB 415.

In operation S907, the electronic apparatus 10 may determine whether to transform and/or modify the image corresponding to the security information, based on the identified security information. The electronic apparatus 10 may compare the identified security information with a security information pattern stored in the security information pattern DB 425 and determine whether to transform and/or modify the image corresponding to the security information, according to the comparison result. If the security information is identified, the electronic apparatus 10 may transform and/or modify the image corresponding to the security information so as to delete the security information from the content. If the security information is not identified, the electronic apparatus 10 may skip and not transform or modify the image corresponding to the security information from the content.

The electronic apparatus 10 may generate a second content by synthesizing the transformed or modified image with the content and share the second content. The user may conveniently share the content by integrating a process of sharing the content and a process of deleting the security information.

Exemplary embodiments described above with reference to the drawings do not limit the present disclosure. Therefore, various modifications and changes may be made from these descriptions of exemplary embodiments by those skilled in the art. Operations according to exemplary embodiments may be performed by a single processor. In this case, a program command for performing operations embodied by various types of computers may be recorded on a computer readable recording medium. The computer readable recording medium may include a program command, a data file, a data structure, or combinations thereof. The program command may be particularly designed and configured for the present invention or may be known to and used by those skilled in the art. Examples of the computer readable recording medium may include a magnetic medium such as a hard disk, a floppy disk, and a magnetic tape, an optical recording medium such as CD-ROM or a DVD, an magnetic-optical medium such as a floptical disk, and a hardware device particularly configured to store and perform a program command such as a ROM, a RAM, a flash memory, or the like. Examples of the program command include machine language codes that are formed by a compiler and high-level language codes that may be executed by a computer by using an interpreter or the like. If all or some of base stations or relays described herein are embodied as a computer program, a computer readable recording medium storing the computer program is included in the present invention. Therefore, the scope of an inventive concept is not limited to the described exemplary embodiments and may be determined by claims that will be described later and by equivalents to the claims.

What is claimed is:

1. An electronic apparatus comprising:
   a memory; and
   a processor configured to:
      receive a user command for sharing a first image;
      based on the user command being received, search the first image for a region comprising security information by comparing the first image with a plurality of reference images stored in the memory, the plurality of reference images comprising images of components capable of indirectly including the security information projected onto a reflective surface;
      extract the region including the security information from the first image; and
      transform the first image into a second image by removing the security information from the region of the first image,
      wherein the region includes the security information projected on an apparatus captured in the first image.

2. The electronic apparatus of claim 1, wherein the processor is further configured to transform the first image in response to identifying the security information in the first image.

3. The electronic apparatus of claim 2, wherein the processor is further configured to identify a type of the identified security information and transform the first image based on the identified type of the security information.

4. The electronic apparatus of claim 3, wherein the type of the security information comprises at least one selected from among a fingerprint, an iris, a number, a letter, and a pattern.

5. The electronic apparatus of claim 2, further comprising:
   a communicator configured to communicate with an external apparatus,
   wherein the processor is further configured to generate the second image by synthesizing the region not including the security information with remaining portions of the first image with original resolution and transmit the generated second image through the communicator.

6. The electronic apparatus of claim 2, wherein the processor is further configured to transform the first image by changing a resolution of the first image or by distorting the first image.

7. The electronic apparatus of claim 1, wherein the processor is further configured to store an image database (DB) comprising the plurality of reference images in the memory, and
   wherein the plurality of reference images comprises images of human body parts capable of having the security information.

8. The electronic apparatus of claim 1, wherein the processor is further configured to receive data comprising the plurality of reference images from an external server through a communicator and perform searching for the region with reference to the received data.

9. The electronic apparatus of claim 1, wherein the images of components capable of indirectly including the security information projected onto a reflective surface comprise an image of a glass, an image of glasses, and an image of an exterior surface of an apparatus.

10. A method of transforming a content of an electronic apparatus, the method comprising:
    receiving a user command for sharing a first image;
    based on the user command being received, searching the first image for a region comprising security information by comparing the first image with a plurality of reference images stored in a memory, the plurality of reference images comprising images of components capable of indirectly including the security information projected onto a reflective surface;
    extracting the region including the security information from the first image; and
    transforming the first image into a second image by removing the security information from the region of the first image,
    wherein the region includes the security information projected on an apparatus captured in the first image.

11. The method of claim 10, wherein the searching comprises searching for the region comprising the security information with reference to an image database (DB), which stores the plurality of reference images, and
    wherein the plurality of reference images comprise images of human body parts capable of having the security information.

12. The method of claim 10, wherein an image database (DB) is external to the electronic apparatus.

13. The method of claim 10, wherein an image database (DB) is stored in the electronic apparatus.

14. The method of claim 10, further comprising:
    determining a type of the security information in the region.

15. The method of claim 14, wherein the type of the security information comprises at least one selected from among a fingerprint, an iris, a number, a letter, and a pattern.

16. The method of claim 14, wherein the first image is transformed based on the determined type of the security information.

17. The method of claim 10, wherein the images of components capable of indirectly including the security information projected onto a reflective surface comprise an image of a glass, an image of glasses, and an image of an exterior surface of an apparatus.

* * * * *